Dec. 15, 1942.    C. G. PULLIN    2,305,389
ROTARY WING AIRCRAFT
Filed May 25, 1940    6 Sheets-Sheet 1
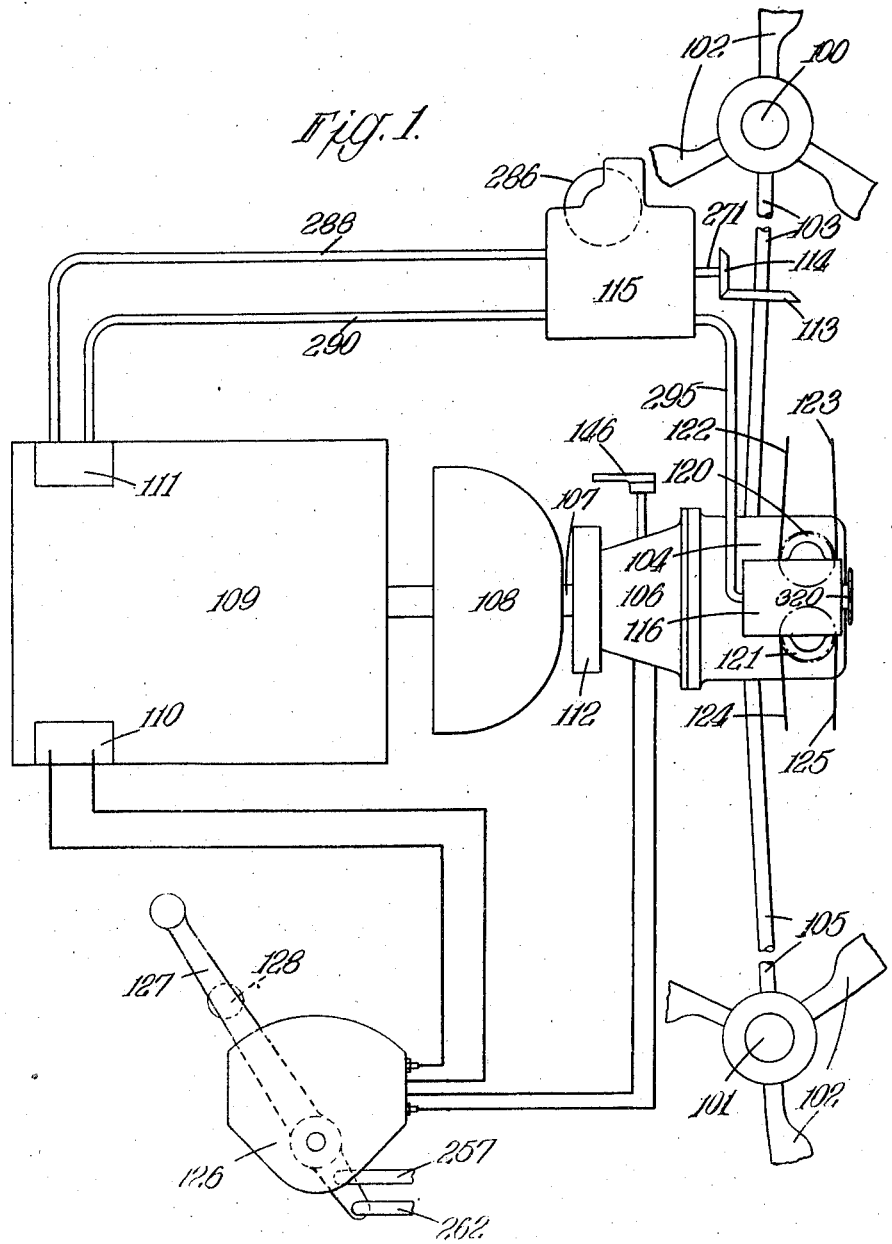
INVENTOR
Cyril George Pullin
ATTORNEYS
Synnestvedt + Lechner

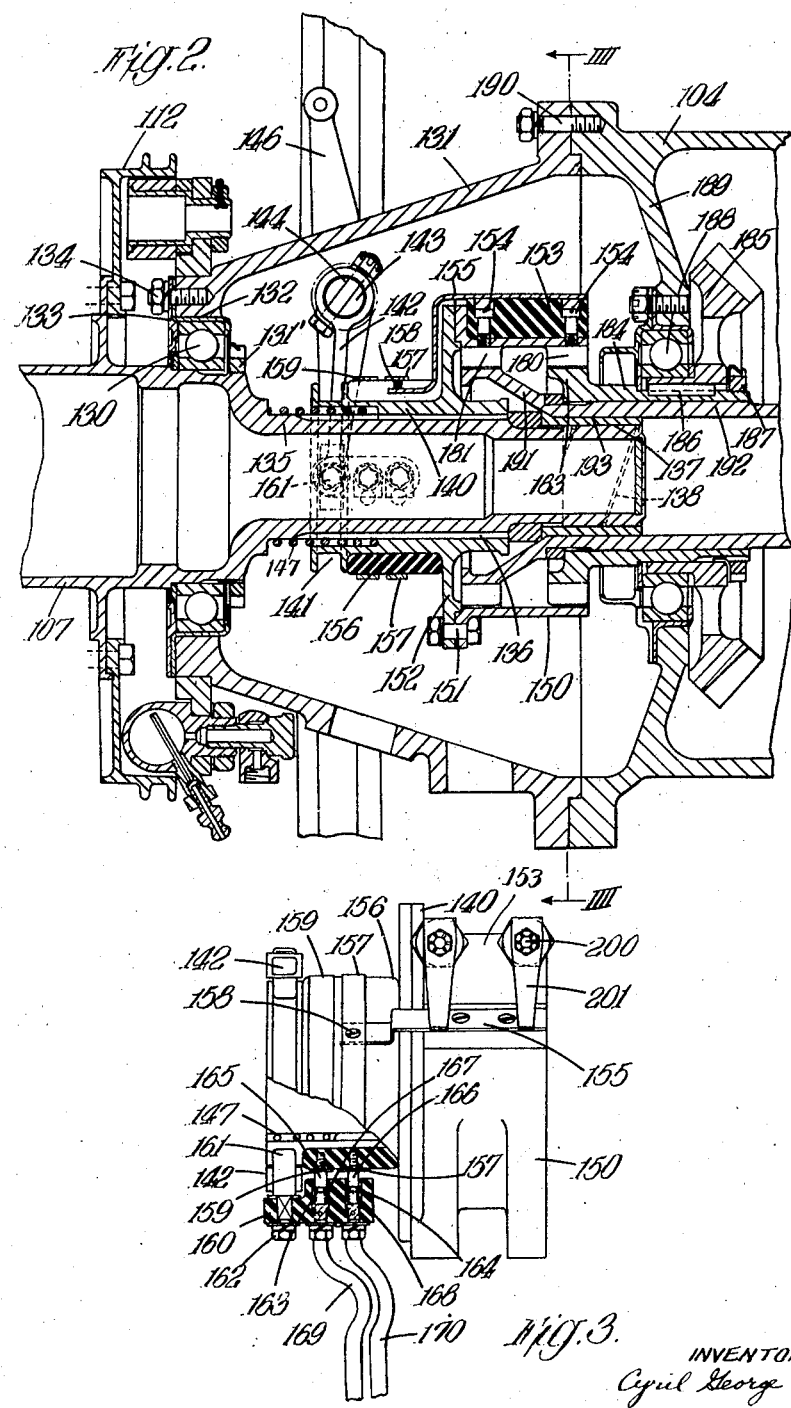

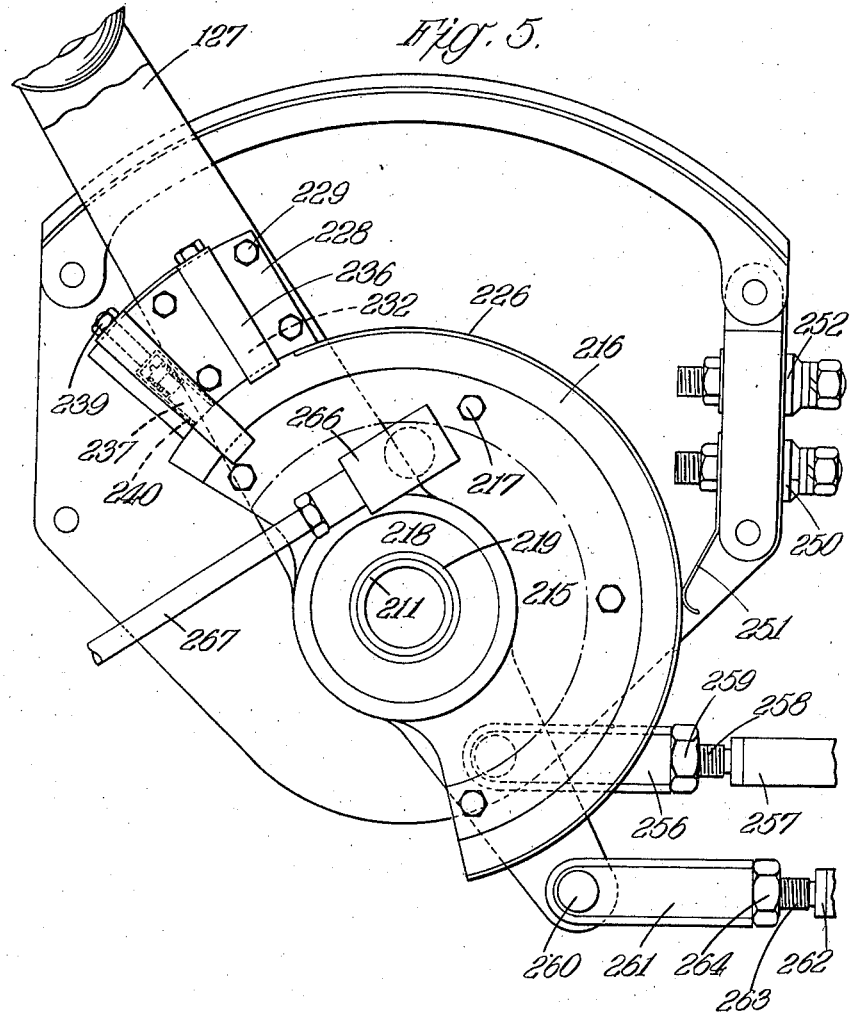
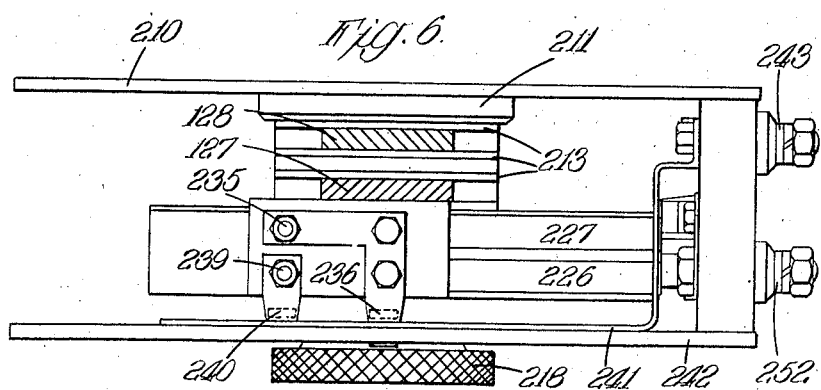

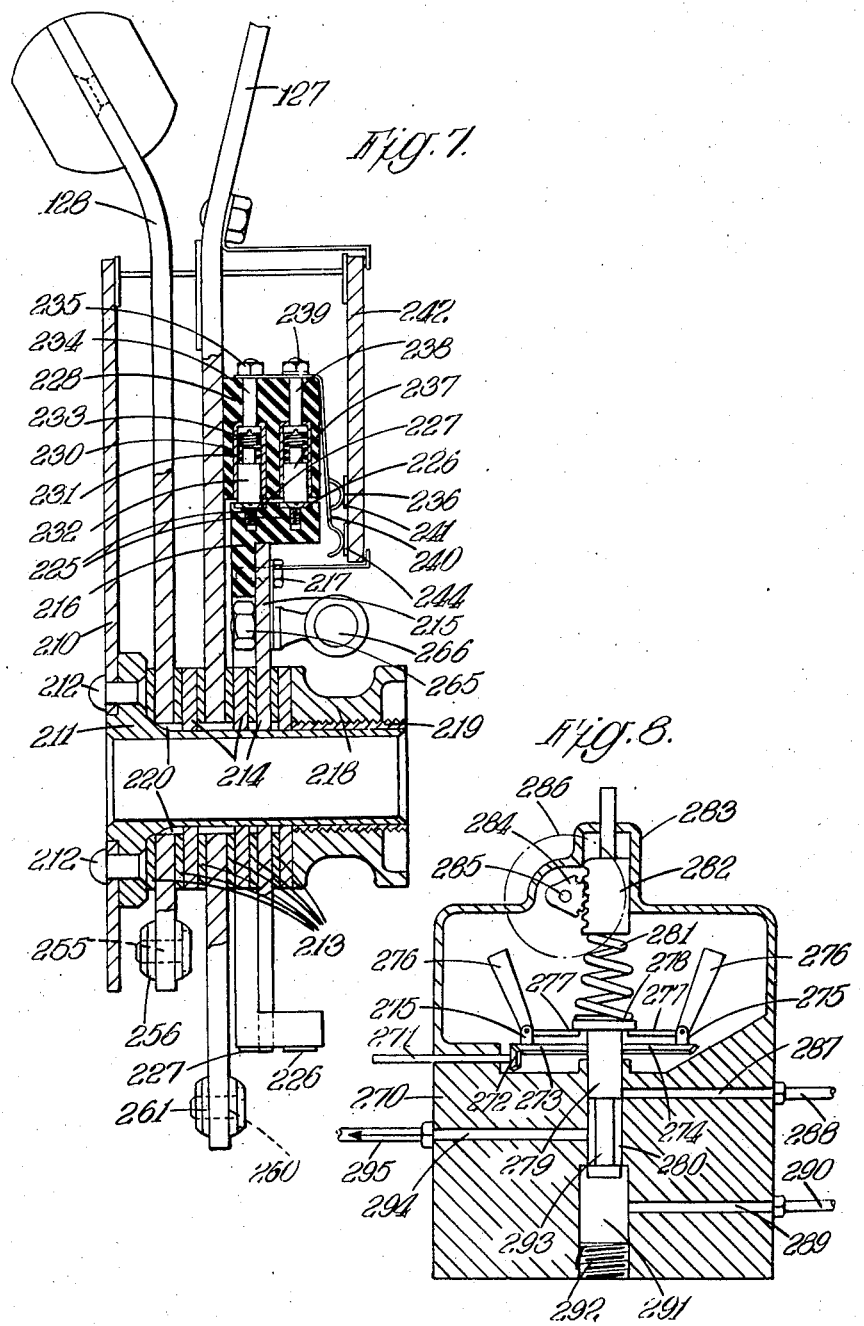

Dec. 15, 1942.  C. G. PULLIN  2,305,389
ROTARY WING AIRCRAFT
Filed May 25, 1940  6 Sheets-Sheet 6

INVENTOR
Cyril George Pullin
ATTORNEYS

Patented Dec. 15, 1942

2,305,389

UNITED STATES PATENT OFFICE 2,305,389

ROTARY WING AIRCRAFT

Cyril George Pullin, Genista, Newton Mearns, Scotland, assignor to Autogiro Company of America, Willow Grove, Pa., a corporation of Delaware Application May 25, 1940, Serial No. 337,171
In Great Britain March 18, 1939

28 Claims. (Cl. 244—17)

The present invention relates to rotative wing aircraft, more particularly of the type in which the sustaining rotor or rotors are normally power driven during flight.

An object of this invention is to provide means for preventing the re-application of power to the rotor or rotors following a failure of the power unit or rotor transmission during flight.

The present invention contemplates the employment of means responsive to the torque being transmitted to the rotor blades to stop or greatly reduce the power of the power unit, thereby preventing the re-application of the normal driving torque. For instance the device may be arranged to stop the power unit, for example by short-circuiting the low tension winding of the magneto or alternatively by closing the throttle.

It is known that, in a rotor having drag articulations between the blades and the hub, movement about such articulations occurs according to whether or not torque is applied to the rotor. During autorotation the blades, under the influence of centrifugal and autorotative forces, take up positions in advance of the radial positions, but when the rotor is driven by a power unit the blades lag behind the radial positions by an amount dependent on the angle of incidence of the blades. In one form of construction in accordance with this invention this movement about the drag articulations is utilised to actuate a switch which operates to stop the power unit in the event of the failure of the latter or of the transmission which would allow the rotor blades to move forwardly from the lagging positions which they assume while the rotor is power driven to positions corresponding to autorotation.

In an alternative construction a device responsive to the torque being transmitted from the power unit to the rotor or rotors is introduced in the rotor transmission. In the event of failure of the power unit, this device operates to stop the power unit or to reduce its power output and so prevent the re-application of normal driving torque to the rotor or rotors.

It is to be understood that means are provided for disconnecting the rotor or rotors from the power unit so that in the event of a failure of the power unit or rotor transmission, the rotor or rotors can operate autorotatively to provide sufficient lift to enable the aircraft to be landed safely.

The accompanying drawings show by way of example two embodiments of the present invention.

In the drawings:

Fig. 1 is a diagrammatic plan view showing the invention as applied to an aircraft having a pair of sustaining rotors disposed on either side of the axis of symmetry of the aircraft;

Fig. 2 is a fragmentary axial sectional view through the torque responsive device;

Fig. 3 is a fragmentary view, partly in section, taken at right angles to Fig. 2 and showing the central part only of the mechanism of Fig. 2;

Fig. 5 is a sectional view of a control box for the power unit for use in connection with the torque responsive device, illustrated in Figs. 2 to 4, with a side cover removed;

Fig. 6 is a sectional plan of the control box, illustrated in Fig. 5. The control levers are disposed vertically;

Fig. 7 is a sectional view of the control box of Figs. 5 and 6, the control levers being nearly vertical;

Fig. 8 is a somewhat diagrammatic section of a governor unit shown in Fig. 1;

Fig. 10 is an elevational view of this arrangement;

Fig. 11 is a plan view showing the blade in the position which it assumes while torque is being applied to the rotor; and Fig. 12 is a view similar to Fig. 11 showing the blade in the position which it assumes during autorotation of the rotor.

Figure 4:
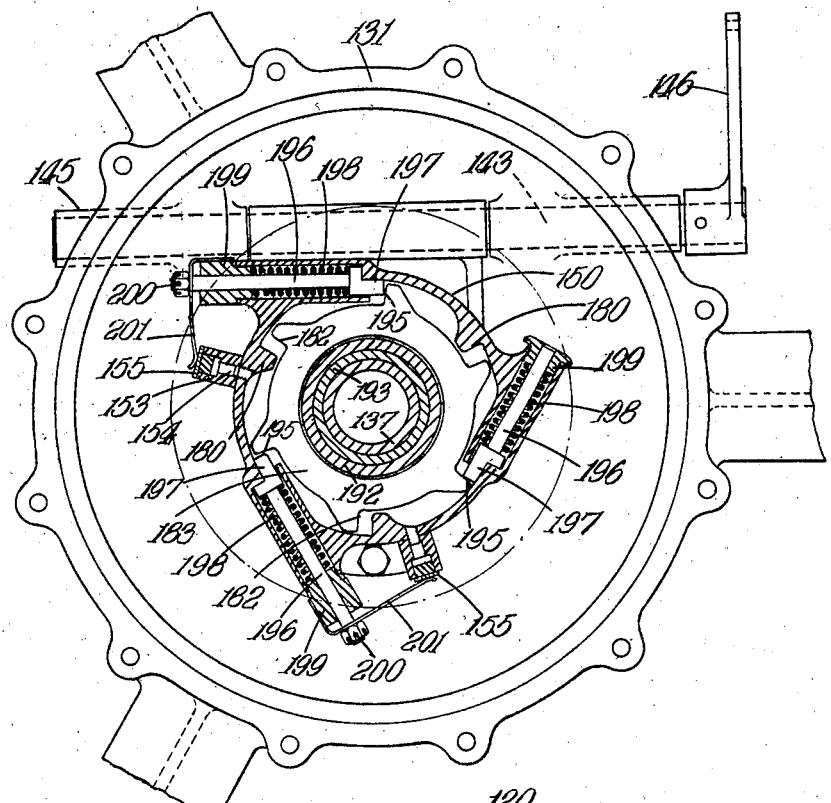
Fig. 4 is a sectional view on the line IIII—IIII of Fig. 2.

Referring to Figs. 1 to 9. An aircraft has a pair of sustaining rotors 100 and 101, with blades 102. The hub of each of the rotors includes a freewheel coupling and a rotor brake which are not illustrated but which are well known in the art. For instance a suitable construction of hub is described and claimed in my copending U. S. application Serial No. 337,381, filed May 27, 1940, corresponding to British application No. 7,609 dated March 9, 1939. Other known forms of rotor hubs having freewheel couplings and/or rotor brakes are disclosed in such issued patents as Bennett, et al. 2,105,682, Campbell 2,127,105, Pecker 2,150,129, Cierva 2,155,409, Larsen 2,183,119, and Ray 2,216,163. The rotor 100 is driven through a shaft 103 from a gearbox 104 on the centre line of the aircraft, while a similar shaft 105 drives the rotor 101. The gearbox 104 has a forward extension 106 enclosing the torque responsive device, illustrated in Figs. 2, 3 and 4. The gearbox 104 is driven through the torque responsive device 106, shaft 107 and a fluid coupling 108 from a power unit 109, having a magneto 110 and a fluid pressure pump 111. A brake drum 112 is mounted on the shaft 107 and is controlled by a lever in the pilot's cockpit which also controls the rotor brakes which are applied simultaneously with the brake 112.

Driven by bevel gearing 113 and 114 from the shaft 103 is a governor unit 115 hereinafter described with reference to Fig. 8, and which is connected by a pipe 295 to a pitch control unit 116 mounted above gearbox 104. The pitch change unit 116 is diagrammatically illustrated in Fig. 9 and has a pair of chain wheels 120 and 121 coupled respectively to the rotors 100 and 101 by chains 122 and 123 and 124 and 125 respectively so that turning of the chain wheels 120 and 121 in opposite directions causes simultaneous pitch change of the two rotors in the same sense. While the pitch change mechanism of the rotor hubs is not illustrated reference may be had to my copending application aforesaid for a full disclosure of a suitable construction. Other known constructions involving pitch change mechanism are disclosed in several of the above-mentioned patents, including Pecker 2,150,129 and Cierva 2,155,409.

Electrical connections from the torque responsive device 106 are brought to a power unit control box 126 having control levers 127 and 128 which are coupled to the power unit 109 in the customary manner. Further electrical connections run from the power unit control box 126 to the low tension circuit of the magneto 110 of the power unit. The arrangement of the control box is such that in certain positions of the levers 127 and 128, the torque responsive device 106 is prevented from stopping the power unit 109 in the event of a momentary failure of the latter.

Referring to Figs. 2, 3 and 4. The shaft 107 from the fluid coupling 108 is supported by a journal bearing 130 in the casing 131 of the torque responsive device, the bearing 130 being secured on the shaft 107 by a ring 131' and by an annular member 132 and plate 133 secured by screwed studs 134 to the casing 131. The shaft 107 is extended towards the gearbox by a part 135 of reduced diameter, having external splines 136 and having at its extreme end a spigot bearing surface 137 provided with oil grooves 138. Axially slidable along the splines 136 of the part 135 of the shaft 147 is a clutch annulus 140, having at its left hand end a groove 141, engaged by a striking arm 142 mounted on a shaft 143 and secured thereto by a pin 144. The shaft 143 is journalled in lugs 145 provided in the casing 131. One end of the shaft 143 projects beyond the casing 131 and carries a clutch operating arm 146, by which the clutch can be thrown out to disconnect the drive from the power unit to the rotors. An outer clutch member 150 secured by bolts 151 to a flange 152 of the clutch member 140 carries insulating blocks 153 held in position by bolts 154.

Carried by each of the blocks 153 of which there are three spaced around the periphery of the outer clutch member 150 are metal strips 155 also supported by a ring of insulating material 156, carrying a slip ring 157, which is connected to the strip 155 by a bolt 158. A second slip ring 159 is connected electrically to the clutch member 140. The striking arm 142 carries a block 160 of insulating material which is secured to one of the pins 161, which engages the recess 141 in the clutch member 140, by a screw nut 162 and which has recesses 163 and 164 in which brushes 165 and 166 are slidable. The brush 165 is pressed by a spring 167 into contact with the slip ring 159, while a similar spring 168 presses the other brush 166 into contact with the slip ring 157.

Electrical connections 169 and 170 are taken from the brushes 165 and 166 respectively through the casing 131 and thence to the power unit control box 126 and to the power unit 109.

The inner surface of the outer clutch member 150 is provided with two sets of inwardly extending lugs 180 and 181, each of which has three lugs. When the clutch is in the engaged position the lugs 180 are able to engage the outwardly extending lugs 182 on a flange 183, formed on a stub shaft 184, which has a bevel wheel 185 secured by a key 186 and a screwed ring 187 to its right hand end. The boss of the bevel wheel 185 is supported by a bearing 188 carried by a web 189 within the casing of the gearbox 104 which is secured by studs 190 to the casing 131 of the torque responsive device.

The lugs 181 are able to engage a series of lugs similar to the lugs 182 formed on the flanged end 191 of a shaft 192 concentric with the stub shaft 184 and which carries at its right hand end a bevel wheel from which the shaft 105 to the rotor 101 is driven. A liner 193 held within the hollow shaft 192 cooperates with the spigot bearing surface 137 of the extension 135 of the shaft 107.

When the clutch operating arm 146 is actuated to disengage the clutch, the clutch annulus 140 and outer clutch member 150 are moved to the left against the action of a spring 147 to a position in which the lugs 180 are able to revolve freely without making contact with the lugs 182. In this position the lugs 180 are about midway between the lugs 182 and the corresponding lugs on the flanged end 193 of the shaft 192.

As seen in Fig. 4, a second series of lugs 195 are formed on the flange 183 intermediately between the lugs 182. These lugs 195 cooperate with plungers 196 disposed tangentially which have an end 197 which coacts with the lugs 195 and which are surrounded by coil springs 198 which urge the plungers inwardly. The outer end of the plunger is slidable in a metal bush 199 screwed into a part formed in the outer clutch member 150 for this purpose, as shown in Fig. 4.

There are three of these plungers spaced equidistantly around the periphery of the outer clutch member 150. Two of these plungers are extended at their outer ends by screw threaded parts carrying screw nuts 200 which secure in position contact arms 201. When the plungers are in their innermost positions the free ends of these contact arms are able to make contact with the strips 155, supported by the insulating block 153 mounted on the outer clutch member. Since the plungers 196 are in electrical connection with the outer clutch member 150 it will be seen that the circuit between the brushes 165 and 166 is completed. This position of the plungers 196 is illustrated in Fig. 4 and corresponds to the position obtaining when no torque is being transmitted through the device. When, however, the rotors are being driven, relative movement between the stub shaft 184 and the outer clutch member 150 occurs as the lugs 180 move round to come into contact with the lugs 182, and at the same time the lugs 195 cause outward movement of the plungers which results in separation of the contact arms 201 from the strips 155, thus opening the circuit between the brushes 165 and 166. Similar plungers and associated parts are provided for cooperation with a series of lugs similar to the lugs 195 formed on the flanged end 191 of the shaft 192 so that in the event of the torque transmitted to either of the two rotors 100 and 101 being reduced the circuit between the brushes 165 and 166 will be completed.

The power unit control box referred to as 126 is illustrated in Figs. 5, 6 and 7. The control box comprises a backing plate 210 to which a spindle 211 is secured by rivets 212. The control levers 127 and 128 of the control box are mounted on the spindle 212 which carries bearing rings 213 on either side of each of the control levers and spacing washers 214. Similarly mounted on the spindle 211 is a plate 215 to which a sector 216 of insulating material is secured by bolts 217. The control levers, bearing rings, spacers and plate 215 are secured in position on the spindle 211 by a screwed ring 218 which is carried by a screw thread 219 on the spindle 211. Rotation of the spacers 214 relatively to the spindle is prevented by providing them with inward projections which engage keyways 220 extending along the spindle 211.

The sector 216 of insulating material has secured to it by screws 225 two arcuate contact strips 226 and 227 which, as will be seen from Fig. 5, do not extend the whole way around the sector 216. The throttle control lever 127 has a block of insulating material 228 secured to it by studs 229 and is provided with a recess 230 having a metal liner 231 which forms a housing in which a brush 232 is slidable. The brush 232 is urged downwardly onto the contact strip 227 by a coil spring 233 which is housed within the liner 231. A bolt 234 and nut 235 secure the liner 231 in position and provide connection between the latter and a spring strip 236. A second brush 237 is similarly mounted in a second recess in the block 228 and is connected by a bolt 238 and nut 239 to a second spring strip 240.

The spring strip 236 presses against a contact annulus 241 carried by the front cover plate 242 of the control box and joined to a terminal 243. The spring strip 240 makes a sliding contact with a second contact annulus 244, also carried by the front cover plate 242 and connected to a terminal (not shown) mounted below the terminal 243. Secured to a terminal 250 (see Fig. 5) is a spring contact strip 251 which presses against the arcuate contact strip 226 while a similar strip (not visible) is secured to a terminal 252 above the terminal 250 and makes contact with the second arcuate contact strip 227.

Attached to the lower end of the mixture control lever 128 by a pivot 255 is a link 256 secured to the mixture control rod 257 coupled to the power unit by an adjustment comprising a screw thread 258 and a screw nut 259. Similarly attached to the lower end of the throttle control lever 127 by a pivot 260 is a link 261 secured to the throttle control rod 262 by a similar adjustment 263, 264. The plate 215 has secured to it by a screw nut 265 a pivotal connection 266 to which a rod 267 is secured. The rod 267 is coupled to the lever (not shown) for applying the transmission brake 112 and the rotor brakes and is arranged, when the brakes are applied, to rotate the plate 115 anti-clockwise, as seen in Fig. 5, to a position in which the brushes 232 and 237 are always in contact with the contact strips 226 and 227 no matter what the position of the throttle lever 127, thereby preventing starting of the power unit 109 while the brakes are "on."

The operation of the control box is as follows. When the throttle control lever 127 and plate 215 are in the positions shown in Fig. 5, the brushes 232 and 237 are out of contact with the contact strips 226 and 227 so that the circuit from the torque responsive device 106 to the magneto 110 of the power unit 109 is broken. This position of the throttle control lever 127 corresponds to the full throttle or rotor starting condition. When, however, the throttle control lever 127 is moved to the normal cruising position, the brushes 232 and 237 make contact with the contact strips 227 and 226 respectively. In this position the circuit from the terminal 252 through the contact annulus 244, spring 240, brush 237, contact strip 226, spring 251 to the terminal 250 is completed. Similarly the circuit from the terminal 243 to the terminal below it is completed via the contact annulus 241, spring 236, brush 232 and contact strip 227. The angular position at which the brushes 232 and 237 make contact with the end of the contact strips 227 and 226 can be altered by moving the rod 267 which is coupled to the lever for applying the transmission and rotor brakes as above described. During starting the power unit cannot be switched off by the torque responsive device 106 as the electrical circuit from the latter to the power unit magneto 110 is broken within the control box 126. When, however, the throttle lever 127 is moved to the cruising position the circuit within the control box 126 is completed so that if the torque applied to the rotors decreases to a value allowing the plungers to move inwardly to complete the circuit between the brushes 165 and 166, the power unit is stopped.

Fig. 8 shows diagrammatically the construction of the governor unit 115 which comprises a casing 270 through which passes a driving shaft 271 having at its inner end a bevel pinion 272 meshing with a bevel wheel 273 secured to a plate 274 rotatable about a vertical axis and having on its upper surface a pair of lugs 275 to which are pivotally attached a pair of governor weights 276. Each governor weight has an inward extension 277 which lies under a collar 278 at the upper end of a piston valve rod 279 which is vertically slidable in a bore 280 in the casing 270. The piston valve rod 279 is urged downwardly by a compression coil spring 281, the lower end of which abuts against the collar 278 while the upper end abuts against a rack member 282 which is vertically slidable in guides 283 formed within the upper part of the casing. The rack of the rack member is engaged by a toothed sector 284 carried by a shaft 285 on which is mounted a wheel 286 coupled to a pilot's control for adjusting the equilibrium speed of the governor unit.

Communicating with the upper part of the bore 280 is a duct 287 which is connected to the pressure side of the fluid pump 111 by a pipe 288. A duct 289 connected by a pipe 290 to the suction side of the pump 111 communicates with an enlargement 291 at the lower end of the bore 280 which is closed by a screwed plug 292. The piston valve rod 279 has a part of reduced diameter 293 which, when the governor unit is being rotated at the adjusted equilibrium speed occupies the position shown in Fig. 8. In this position the space surrounding the reduced part 293 of the piston rod, which is always in communication with a duct 294 continued as a pipe 295 to the pitch control unit 116 is not connected to either the pressure or the suction side of the pump 111.

If, however, the speed of the shaft 103 increases, the governor unit driven through the bevel drive 113, 114, is driven more quickly, causing the governor weights 276 to move outwardly so that their inward extensions 277 move the collar 278 upwardly against the action of the spring 281 thereby moving the piston valve rod 279 upwardly to a position in which the duct 287 is put into communication with the duct 294 allowing pressure fluid to pass to the pitch control unit. Conversely, should the speed of the shaft 103 be reduced, the governor weights 276 move inwardly under the action of the spring 281 allowing the piston valve rod 279 to move downwardly to a position in which the duct 294 is put into communication with the duct 289 permitting fluid to return from the pitch control unit 116 to the suction side of the pump 111.

Figure 9:
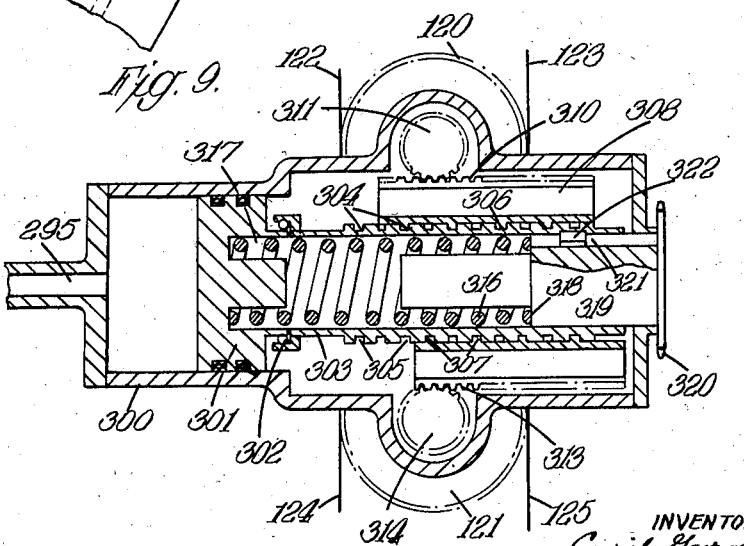
Fig. 9 is a somewhat diagrammatic section of a pitch control unit for use in conjunction with the governor unit shown in Fig. 8.

The pitch control unit 116 is illustrated in Fig. 9. (Features of this unit are claimed in my copending application 331,318, filed April 24, 1940.) It comprises a cylinder 300 in which a piston 301 is slidable and which communicates with the governor unit 115 through the pipe 295. The piston 301 is connected by a journal and thrust bearing 302 to a sleeve 303 having external left and right hand screw threads 304 and 305 which are engaged respectively by projections 306, 307 formed on rack members 308 and 309. The rack 310 of the rack member 308 meshes with a pinion 311 carried on a stub shaft extending through the casing of the pitch control unit to a chain wheel 120 coupled by cables 122, 123 to the pitch control of the rotor 100. Similarly the rack 313 of the rack member 309 meshes with a pinion 314 mounted on a stub shaft carrying a chain wheel 121 coupled by cables 124, 125 to the pitch control of the rotor 101. A construction of rotor hub especially adapted for use in this way is described in my copending British application No. 7,609 of 1939 and its corresponding U. S. application No. 337,381.

A coil spring 316 is arranged to urge the piston 301 towards the left, as seen in Fig. 9, one end of the spring lying in a recess 317 in the back of the piston 301 while the other presses against a collar 318 formed on the elongated shank 319 of a sprocket 320 which is mounted so as to be rotatable but not axially movable relatively to the casing of the pitch control unit. The shank 319 of the sprocket 320 has a keyway 321 engaged by an inwardly projecting key 322 formed on the sleeve 303 which is thereby secured to the sprocket for rotational movement but which is capable of moving axially relatively thereto.

When fluid pressure is applied to the cylinder 300 through the pipe 295 from the governor unit 115, the piston 301 moves to the right, as seen in Fig. 9, carrying with it the sleeve 303 and rack members 308 and 309, thus causing rotation of the pinions 311 and 315 and hence of the chain wheels 120 and 121 in opposite directions. This is arranged to cause an increase of pitch of each of the rotors 100 and 101. Conversely, when the speed of the rotor shaft 103 is reduced, the fluid pressure within the cylinder 300 is reduced by the action of the governor unit allowing the piston 301 to move under the action of the spring 316 to reduce the pitches of both rotors, causing a reduction in the torque which they absorb and tending to allow the speeds of the rotors to return to normal. This normal speed of operation can be altered by the use of the pilot's control coupled to the wheel 286 for altering the equilibrium of the governor unit.

Should the power unit fail the torque transmitted by the torque responsive device 106 will be reduced allowing the driving lugs 180 and 182 on the outer clutch member 150 and flange 183, respectively, to separate under the action of the coil springs 198 which urge the plungers 196 inwardly. This inward movement of the plungers 196 allows the contact arms 201 to touch the strips 155 and so to complete the circuit between the connections 169 and 170 from the brushes 165 and 166. Since during normal flight when the throttle is not fully open, the electrical circuits between the terminals of the power unit control box are also completed, this completion of the circuit between the brushes 165 and 166 will cause the low tension winding of the magneto to be short circuited so stopping the power unit. During starting of the rotors, however, owing to the fact that the circuits within the power unit control box are not completed a reduction in torque will not result in stopping of the power unit.

When the power unit is stopped the freewheel clutches incorporated in the rotor hubs will allow the rotors to overrun the drive but owing to the large angle of incidence of the blades in the helicoptering setting the rotors will tend to slow down rapidly. The stopping of the power unit will also stop the shaft 103 from which the governor unit 115 is driven, thus causing the latter to operate to put the cylinder of the pitch control unit into communication with the suction side of the fluid pump thereby reducing the pitches of both rotors. The position which the piston 301 takes up when the fluid pressure in the cylinder 300 is released is arranged to correspond to rotor pitches within the autorotative range so that each rotor will continue rotating and provide sufficient lift to allow the aircraft to be landed safely.

Lateral control of the aircraft by altering the pitches of the rotors in opposite senses is provided by turning the sprocket 320, causing the sleeve 303 to turn and bring into play the left and right handed screw threads 304 and 305 which cause movement of the rack members 308 and 309 in opposite directions, resulting in an increase of the pitch of one rotor with a corresponding reduction in pitch of the other rotor. The sprocket 320 will normally be coupled to a pilot's control column so that movement of the control column to the left causes an increase of the pitch of the starboard rotor with a corresponding reduction in pitch of the port rotor and vice versa.

Figure 10:
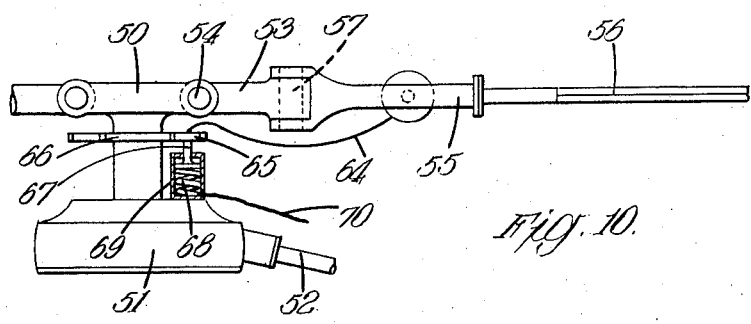
Figs. 10, 11 and 12 illustrate an alternative arrangement in which lead-lag movements of a blade about the drag articulations in response to the torque applied to the rotor are used to actuate a switch.
Figure 11:
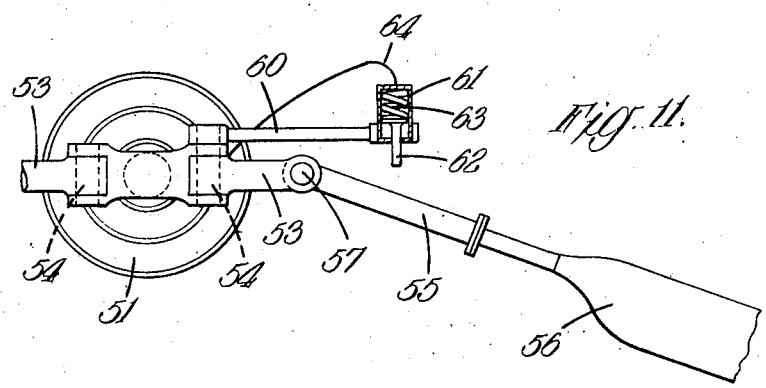
Figure 12:
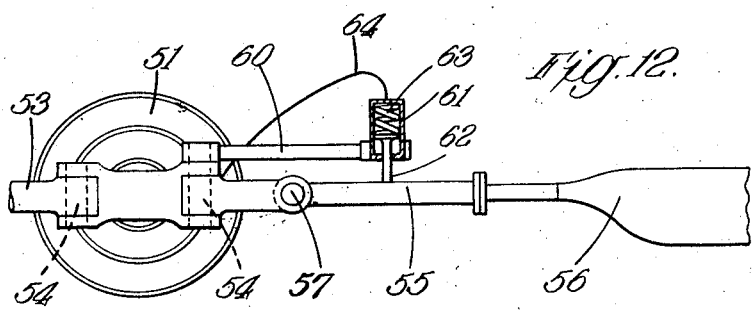

Referring to Figs. 10, 11 and 12 which show an alternative construction. A sustaining rotor has a rotative hub 50 which is driven during normal flight from a shaft 52 through a gearbox 51, which advantageously incorporates a freewheel clutch. In the construction illustrated, the rotor has two blades, each of which has at its root end a link 53 connected to the hub part 50 by a flapping articulation 54. The link is connected to the root member 55 of the blade 56 by a drag articulation 57, the axis of which is generally at right angles to the axis of the flapping articulation 54.

An extension of the flapping articulation pivot carries an arm 60 which is arranged to follow movements of the link 53 about said flapping articulation. Mounted at the outer end of the arm 60 is a housing 61 from which projects a contact plunger 62, which is urged in a downward direction, as seen in Figs. 11 and 12, by a spring 63. From the contact plunger 62 a lead 64 extends to a slip ring 65 carried by a disc of insulating material 66 secured to the rotative hub part 50. Mounted on the casing of the gearbox 51 is a contact plunger 67 which is pressed into contact w'.h the slip ring 65 by a spring 68 which is enclosed within a casing 69. From the contact plunger 67 a lead 70 extends to the means for stopping or reducing the power output of the power unit. For instance it may be connected to the magneto of the power unit or to a relay which operates to reduce the throttle opening.

While the rotor is being driven, each of the blades assumes a lagging position generally as indicated in Fig. 11, the extent of the lag depending upon the angle of incidence of the blade and upon the applied torque. In this lagging position the contact plunger 62 is separated from the blade root member 55. When the rotor is autorotating the blades move forward to a generally radial position, as indicated in Fig. 12. In this position the blade root member 55 makes contact with the contact plunger 62, thus completing an electrical circuit from the casing of the gearbox 51 through the hub member 50, link 53, blade root member 55, contact plunger 62, connection 64, slip ring 65, contact plunger 66 to the lead 70 thus preventing the re-application to the rotor or rotors of the full torque of the power unit. If desired the above described device responsive to the torque applied to the rotor or rotors can be used in conjunction with the power unit control box described with reference to Figs. 5, 6 and 7.

What I claim is:

1. In an aircraft, a variable pitch bladed sustaining rotor normally power driven during flight, a power unit, a power transmission from the power unit to the rotor, means operative in response to a substantial decrease in the torque transmitted to the rotor blades to prevent the reapplication of the normal driving torque, and means automatically operative upon substantial decrease in rotor R. P. M. to lower the mean blade pitch angle.

2. In an aircraft, a variable pitch bladed sustaining rotor normally power driven during flight, a power unit, a power transmission from the power unit to the rotor, means incorporated in the power transmission operation in response to a substantial decrease in the torque transmitted to the rotor to prevent the reapplication of the normal driving torque, and means automatically operative upon substantial decrease in rotor R. P. M. to lower the mean blade pitch angle.

3. In an aircraft, a bladed sustaining rotor normally power driven during flight, a power unit, a power transmission from the power unit to the rotor, torque responsive means included in the power transmission and comprising a spring which is compressed during the application of the normal torque to the rotor and which when the torque is reduced expands to close an electric circuit controlling the operation of the power unit, thereby preventing the reapplication to the rotor of the normal driving torque.

4. In an aircraft, a bladed sustaining rotor normally power driven during flight, a power unit, a power transmission from the power unit to the rotor, torque responsive means included in the power transmission comprising a spring which is compressed during the application of normal torque to the rotor, a plunger surrounded by the spring and carrying a contact arm which is adapted to connect with a slip ring on expansion of the spring when the torque is reduced, thereby closing an electric circuit preventing the reapplication of the normal driving torque to the rotor.

5. In an aircraft, a pair of bladed sustaining rotors normally power driven during flight, a power unit, a power transmission from the power unit to each of the rotors, and means responsive to a substantial decrease in the torque transmitted to a rotor to prevent the reapplication of the normal driving torque to either rotor.

6. In an aircraft, a pair of bladed sustaining rotors normally power driven during flight, a power unit, a power transmission from the power unit to each of the rotors, torque responsive means included in the power transmission to each of the rotors comprising springs which are compressed during the application of normal torque to the rotors, plungers surrounded by each spring and carrying contact arms which are adapted to connect with a slip ring on expansion of the springs when the torque is reduced, thereby closing an electric circuit preventing the reapplication of the normal driving torque to the rotors.

7. In an aircraft, a pair of bladed sustaining rotors normally power driven during flight, a power unit including a magneto, a power transmission from the power unit to each of the rotors, torque responsive means included in the power transmission to each of the rotors comprising springs which are compressed during the application of normal torque to the rotors, plungers surrounded by each spring and carrying contact arms which are adapted to connect with a slip ring on expansion of the springs when the torque is reduced, thereby short-circuiting the low tension winding of the magneto of the power unit, stopping the latter and preventing the reapplication of the normal driving torque to the rotors.

8. In an aircraft, a bladed sustaining rotor normally power driven during flight, a power unit, a power transmission from the power unit to the rotor, torque responsive means included in the power transmission comprising a spring which is compressed during the application of normal torque to the rotor, a plunger surrounded by the spring and carrying a contact arm which is adapted to connect with a slip ring on expansion of the spring when the torque is reduced, thereby short-circuiting the low tension winding of the magneto of the power unit, stopping the latter and preventing the reapplication of the normal driving torque to the rotors.

9. In an aircraft, a bladed sustaining rotor normally power driven during flight, a power unit, a power transmission from the power unit to the rotor, and means operative upon said unit in response to a substantial decrease in the torque transmitted to the rotor blades to materially reduce the power output of said unit, whereby to prevent the reapplication of the normal driving torque to the rotor.

10. In an aircraft, a bladed sustaining rotor normally power driven during flight, a power unit, a power transmission from the power unit to the rotor, means operative in response to a substantial decrease in the torque transmitted to the rotor blades to prevent the reapplication of the normal driving torque, a control box for the power unit and an interconnection between said control box and said torque responsive means for preventing the operation of the latter under certain settings of the power unit controls.

11. In an aircraft, a bladed sustaining rotor normally power driven during flight, a power unit, a power transmission from the power unit to the rotor, means operative in response to a substantial decrease in the torque transmitted to the rotor blades to prevent the reapplication of normal driving torque, a power unit throttle control and an interconnection between the throttle control and the torque responsive means for preventing the operation of the latter when the power unit throttle is fully open for starting purposes.

12. In an aircraft, a sustaining rotor normally power driven during flight, a power unit, a power transmission from the power unit to the rotor, the latter having a hub and blades connected to the hub by drag articulations and means responsive to movement of the blades about said drag articulations in the event of a decrease of the applied torque to a sub-normal value operative to prevent the reapplication to the rotor of the normal driving torque.

13. In an aircraft, a sustaining rotor normally power driven during flight, a power unit, a power transmission from the power unit to the rotor, the latter having a hub and blades connected to the hub by drag articulations, means operative in response to movement of a blade from the lagging position which it assumes while torque is being applied to the rotor to a generally radial position to prevent the reapplication to the rotor of the normal driving torque.

14. In an aircraft, a sustaining rotor normally power driven during flight, a power unit, a power transmission from the power unit to the rotor, the latter having a hub and blades connected to the hub by drag articulations, flapping articulations between each blade and the hub, an arm arranged to partake of flapping movements of a blade about its flapping articulation and carrying a contact adapted to make contact with the blade root in the event of movement of the blade from the lagging position which it assumes while torque is being applied to the rotor to a generally radial position, and an electric circuit including said contact and the blade root for preventing the reapplication to the rotor of the normal driving torque.

15. In an aircraft, a sustaining rotor normally power driven during flight, a power unit including a magneto, a power transmission from the power unit to the rotor, the latter having a hub and blades connected to the hub by drag articulations, flapping articulations between each blade and the hub, an arm arranged to partake of flapping movements of a blade and carrying a contact adapted to make contact with the blade root in the event of movement of the blade from the lagging position which it assumes while torque is being applied to the rotor to a generally radial position, and an electric circuit including said contact and the blade root arranged to short circuit the low tension winding of the magneto to prevent the reapplication to the rotor of the normal driving torque.

16. In an aircraft, a sustaining rotor normally power driven during flight, a power unit including a magneto, a power transmission from the power unit to the rotor, the latter having a hub and blades connected to the hub by drag articulations, flapping articulations between each blade and the hub, an arm arranged to partake of flapping movements of a blade and carrying a contact adapted to make contact with the blade root in the event of movement of the blade from the lagging position which it assumes while torque is being applied to the rotor to a generally radial position, an electric circuit including said contact and the blade root arranged to short circuit the low tension winding of the magneto of the power unit to prevent the reapplication to the rotor of the normal driving torque, and a control box for the power unit including an electric circuit which when the throttle lever is in the full throttle position prevents the short-circuiting of the magneto.

17. In an aircraft, a bladed sustaining rotor normally power driven during flight, a power unit including a magneto, a power transmission from the power unit to the rotor, means responsive to a substantial decrease in the torque transmitted to the rotor operative to connect electrically a pair of terminals, a control box for the power unit including a throttle control movable about a pivot axis, an arcuate contact strip carried by a plate rotatable about said pivot axis, a contact element mounted on the throttle control adapted to make contact with the arcuate contact strip, means for turning the plate into a position in which the contact element mounted on the throttle control no longer makes contact with the arcuate contact strip when the throttle control is in the full throttle position, and an electric circuit including in series said terminals, the contact element and the arcuate contact strip adapted to short circuit the low tension winding of the magneto of the power unit.

18. In an aircraft, a bladed sustaining rotor normally power driven during flight, a power unit including a magneto, a power transmission from the power unit to the rotor, a rotor brake included in said transmission, means responsive to a substantial decrease in the torque transmitted to the rotor operative to connect electrically a pair of terminals, a control box for the power unit including a throttle control movable about a pivot axis, an arcuate contact strip carried by a plate rotatable about said pivot axis, a contact element mounted on the throttle control adapted to make contact with the arcuate contact strip, a rotor brake lever, a link coupled to the latter and to the plate to rotate said plate to a position in which the contact element mounted on the throttle control can no longer make contact with the arcuate contact strip when the throttle control is in the full throttle position, and an electric circuit including said terminals, the contact element and the arcuate contact strip in series adapted to short circuit the low tension winding of the magneto.

19. In an aircraft having a sustaining rotor incorporating a blade mounted with freedom for movement in a direction generally fore and aft within its rotative path of travel, engine means for driving the rotor, a control device on which operation of the engine is dependent, and means responsive to lag-lead movements of the blade operative in one position to condition said control device for engine operation and in another position to condition said control device for engine stoppage.

20. In an aircraft having a sustaining rotor incorporating a blade mounted with freedom for movement in a direction generally fore and aft within its rotative path of travel, engine means for driving the rotor, power transmission means for delivering torque from the engine means to the rotor incorporating an overrunning clutch, a control device on which operation of the engine is dependent, and means responsive to lag-lead movements of the blade operative to condition the control device to stop the engine upon leading movement of the blade and to condition the control device for engine operation upon lagging movement of the blade.

21. A construction in accordance with claim 19, in which the engine control device comprises a magneto and in which said means responsive to lag-lead movements of the blade acts to render said magneto inoperative upon leading movement of the blade and to render said magneto operative upon lagging movement of the blade.

22. In an aircraft, a blade sustaining rotor, engine means for driving the rotor, power transmission means for delivering torque from the engine means to the rotor, a control device on which operation of the engine is dependent, and means responsive to fluctuations in torque transmitted to the rotor through said power transmission means to condition said control device for engine operation and for engine stoppage.

23. In an aircraft, a blade sustaining rotor, engine means for driving the rotor, power transmission means for delivering torque from the engine means to the rotor, a control device on which operation of the engine is dependent, and means responsive to fluctuations in torque transmitted to the rotor through said power transmission means to condition said control device for engine operation and for engine stoppage, said last means being operative to condition the control device to stop the engine means upon a substantial decrease in rotor driving torque.

24. In an aircraft having a sustaining rotor, engine means for driving the rotor, power transmission means for delivering torque from the engine means to the rotor, and a torque responsive device for controlling engine operation in a sense providing for termination of engine operation upon substantial drop in rotor driving torque.

25. An aircraft in accordance with claim 24, and further incorporating an adjustable speed control for the engine means, and mechanism interrelating the operation of the speed control and of said torque responsive means and providing against operation of the torque responsive means to shut off the engine when the speed control is adjusted for high speed operation of the engine means.

26. In an aircraft, a variable pitch sustaining rotor adapted alternatively to be power driven with a relatively high mean pitch setting and to be autorotationally actuated with a relatively low mean pitch setting, engine means for driving the rotor, power transmission means for delivering torque from the engine means to the rotor including a device for rendering the transmission ineffective during autorotational flight, a torque responsive device for controlling engine operation in a sense providing for termination of engine operation upon substantial drop in rotor driving torque, an adjustable speed control for the engine means, and mechanism associated with the speed control and with said torque responsive device for rendering the latter ineffective to shut off the engine when the speed control is adjusted for high speed operation of the engine.

27. In an aircraft, a variable pitch sustaining rotor adapted alternatively to be power driven with a relatively high mean pitch setting and to be autorotationally actuated with a relatively low pitch setting, engine means for driving the rotor, power transmission means for delivering torque from the engine means to the rotor including a free wheeling clutch for autorotational flight, a torque responsive device for controlling engine operation in a sense providing for termination of engine operation upon substantial drop in rotor driving torque, an adjustable speed control for the engine means, mechanism associated with the speed control and with said torque responsive device for rendering the latter ineffective to shut off the engine when the speed control is adjusted for high speed operation of the engine, means for varying the mean pitch angle of the rotor blades, and means operative upon substantial reduction in R. P. M. of the rotor below the high speed thereof corresponding to the high speed operation of the engine aforesaid to decrease the mean pitch of the rotor blades.

28. In an aircraft, a sustaining rotor, a rotor brake, engine means for driving the rotor, a control device on which operation of the engine is dependent, and mechanism interrelating the operation of the rotor brake and the said control device and providing against starting of the engine when the rotor brake is applied.

CYRIL GEORGE PULLIN.

CERTIFICATE OF CORRECTION.

Patent No. 2,305,389. December 15, 1942.

CYRIL GEORGE PULLIN.

It is hereby certified that error appears in the printed specification of the above numbered patent requiring correction as follows: Page 2, first column, line 59, for "shaft 147" read --shaft 107--; and second column, line 6, for "engages" read --engage--; page 4, second column, line 8, before "of" insert --speed--; page 7, first column, lines 19 and 28, claims 22 and 23, for "blade" read --bladed--; and that the said Letters Patent should be read with this correction therein that the same may conform to the record of the case in the Patent Office.

Signed and sealed this 26th day of January, A. D. 1943.

(Seal)

Henry Van Arsdale,
Acting Commissioner of Patents.